United States Patent
Bruekers et al.

(10) Patent No.: US 6,792,444 B2
(45) Date of Patent: Sep. 14, 2004

(54) FILTER DEVICES AND METHODS

(75) Inventors: Alphons Antonius Maria Lambertus Bruekers, Eindhoven (NL); Adriaan Johannes Rijnberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 457 days.

(21) Appl. No.: 10/015,706

(22) Filed: Nov. 30, 2001

(65) Prior Publication Data
US 2002/0118740 A1 Aug. 29, 2002

(30) Foreign Application Priority Data

Dec. 6, 2000 (EP) .............................................. 00204354

(51) Int. Cl.[7] .............................................. G06F 7/38
(52) U.S. Cl. .................................... 708/551; 708/300
(58) Field of Search .............................. 708/300, 306, 708/550–552

(56) References Cited

U.S. PATENT DOCUMENTS

| | | | | | |
|---|---|---|---|---|---|
| 4,965,668 | A | * | 10/1990 | Abt et al. | 348/574 |
| 5,787,390 | A | * | 7/1998 | Quinquis et al. | 704/219 |
| 6,650,255 | B2 | * | 11/2003 | Bruekers et al. | 341/50 |
| 2001/0025292 | A1 | * | 9/2001 | Denk et al. | 708/550 |
| 2002/0059351 | A1 | * | 5/2002 | Shiraishi | 708/306 |
| 2002/0099747 | A1 | * | 7/2002 | Timko et al. | 708/300 |
| 2002/0161806 | A1 | * | 10/2002 | Shaikh | 708/300 |

FOREIGN PATENT DOCUMENTS

| | | | |
|---|---|---|---|
| EP | 1052622 | * | 11/2000 |
| WO | WO0041313 | * | 7/2000 |

OTHER PUBLICATIONS

Chen et al, "A fixed–point 16 kb/s LD–CELP Algorithm", Inter. Confer. on Acoustics, Speech, and Signal Processing, IEEE, 1991, pp. 21–24.*

Chen et al, "Improving the performance of the 16 kb/s LD–CELP speech coder", Inter. Confer. on Acoustics, Speech, and Signal Processing, IEEE, 1992, pp. 69–72.*

* cited by examiner

Primary Examiner—Tan V. Mai

(57) ABSTRACT

A filtering method is proposed wherein first several filtering steps (I–III, IV–VI) are made. Each step (I–III,IV–VI) includes: generating a filtered signal (I,IV), rounding this filtered signal (II,V) to a certain accuracy and combining (III,VI) the rounded signal with the input signal, whereby a filter error is obtained. The filtered signals are combined (VII) to a first filtered signal that is rounded (VIII) and combined (IX) with the input signal, whereby a coded signal is obtained. This allows to adapt the rounding step (II,V) and the combining step (III,VI) in each filtering step to specific filter design. Thereby limit cycles are reduced, the first filtered signal is available for further processes and the rounding can be inverted in the reverse process. Further a filter method for the reverse process, filter devices (1,10) able to perform these methods and devices (20,30,40,50,60) containing such devices are provided.

29 Claims, 6 Drawing Sheets

FILTER DEVICES AND METHODS

The invention relates to a filtering method, including: generating a primary filtered signal of an input signal; rounding the primary filtered signal to a primary rounded signal; and combining the primary rounded signal with said input signal for calculating a primary filter error or coded signal.

From general filter theory, it is known that it may be advantageous to replace a primary filter by a cascade of secondary filters performing parts of the function of the primary filter. However, this cascading is not necessarily advantageous.

For example, in predictive filtering this imposes several problems. A method for such prediction filtering is known from: A. A. M. L. Bruekers, A. W. J. Oomen, R. J. v.d. Vleuten and L. M. van de Kerkhof, "*Lossless coding for DVD audio*", AES $101^{st}$ convention, Los Angeles (Preprint 4358 November 1996) and from: A. A. M. L. Bruekers, A. W. J. Oomen, R. J. v.d. Vleuten and L. M. van de Kerkhof, "*Improved lossless coding of 1-bit audio signals*", AES $103^{rd}$ convention, New York (Preprint 4563 September 1997).

In the method described in the first 'Bruekers' article, a signal is encoded by prediction filtering. The prediction filtering described in this prior art document includes the steps of: generating a primary prediction signal of an input signal, based on preceding input signals; rounding said primary prediction signal to a primary rounded signal; and subtracting said primary rounded signal from said input signal for calculating a primary filter error or coded signal. In the method described in the second 'Bruekers' article the input signal is a 1-bit signal. Simply applying a cascade of secondary filters imposes several problems in these methods. Firstly, the least significant digit (lsd) of the prediction error or coded signal has to be at least as significant as the lsd of the input signal in order to prevent the coded signal to have less significants lsd's. Therefor, the secondary prediction signal has to be rounded to a certain lsd. However, this rounding causes a distortion of the prediction error or coded signal, whereby subsequent prediction of the distorted prediction error or coded signal by a next secondary filter is disturbed.

Secondly, the prediction signal itself is needed for further coding processes like Direct Stream Transfer (DST) as is used in the Super Audio CD (SACD) standard. Thirdly, if a recursive filter structure or Infinite Impulse Response (IIR) filter, as is commonly known in filtering, is used, the rounding step may cause limit cycles, i.e. if there is no input signal, there should be no prediction signal but the rounding step may result in a non zero rounded signal and therefore in a prediction error. Although identical limit cycles in the decoder guarantee that there is no output signal or decoded signal, the efficiency of the coding is effected negatively. At the decoding side this will result in a decoded signal, though there was no input signal at all at the encoding side.

The invention intends to solve these problems. Therefore, in accordance with the invention a filtering method as indicated above is characterised in that the step of generating the primary filtered signal includes: at least one secondary filtering step including the steps of: generating a secondary filtered signal of a source signal; rounding the secondary filtered signal to a secondary rounded signal; and combining the secondary rounded signal with said source signal for calculating a secondary filter error.

Such a method makes it possible to round each secondary filtered signal to any bit size required by the specific application of the method, because only the primary filtered signal has to be rounded to the required lsd, for that is the signal that is used to calculate the filter error or coded signal. The steps of rounding the secondary filtered signals are reversible steps because the only required rounding that is limited by the further application of the signals is the rounding of the primary filtered signal, and it is possible to reconstruct this primary rounding in the decoding process. Furthermore, the primary filtered signal is obtained, so this signal can be used in further filtering processes. Since the rounding of the secondary filtered signal can chosen to be of any resolution, a rounding step can be applied that reduces the limit cycles.

The invention also provides a reversed filtering method as is claimed in claim 11. Such a method allows reverse filtering or decoding of an primary filtered signal.

Furthermore, the invention provides a filter device for performing a method according to the invention, as is claimed in claim 12. The invention also provides a filter device as is claimed in claim 22.

Particularly advantageous elaborations of the invention are set forth in the dependent claims. Further details, aspects and embodiments of the invention will be described with reference to the attached drawing.

Figure 3:
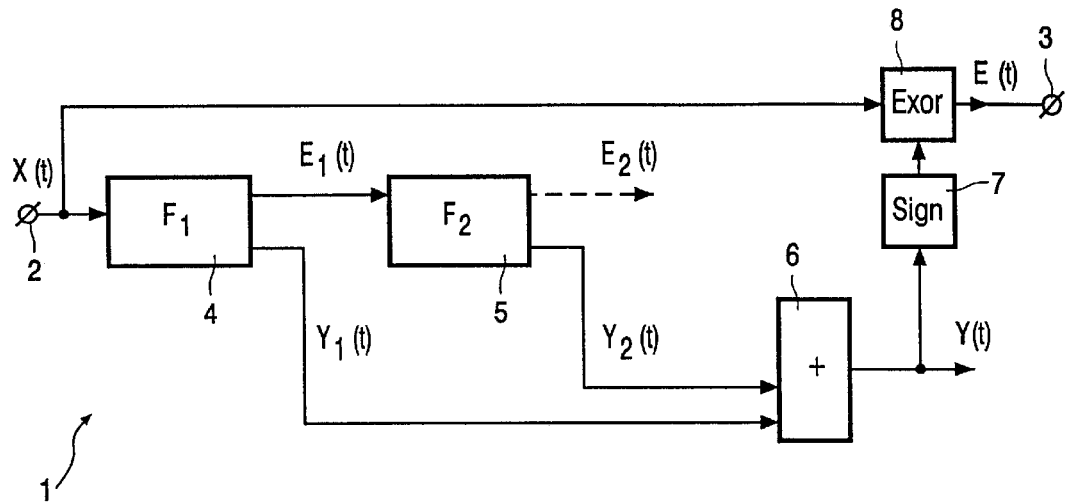

FIG. 3 diagrammatically shows an example of a filter device for 1 bit signals according to the invention.

Figure 4:
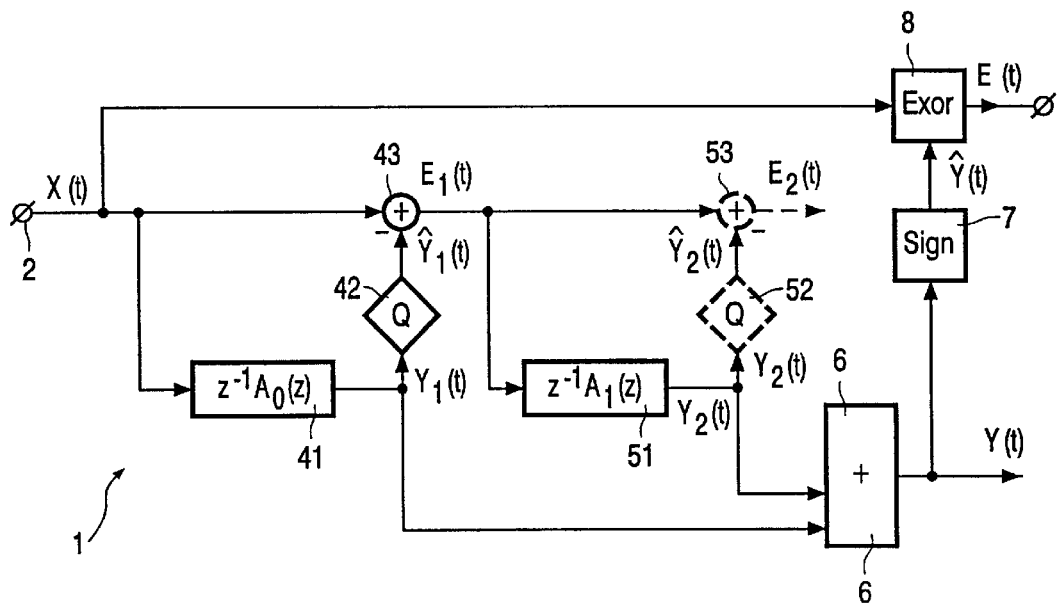

FIG. 4 diagrammatically shows an example of a filter device for 1 bits signals according to the invention in which the secondary filter devices are Finite Impulse Response (FIR) filters.

Figure 5:
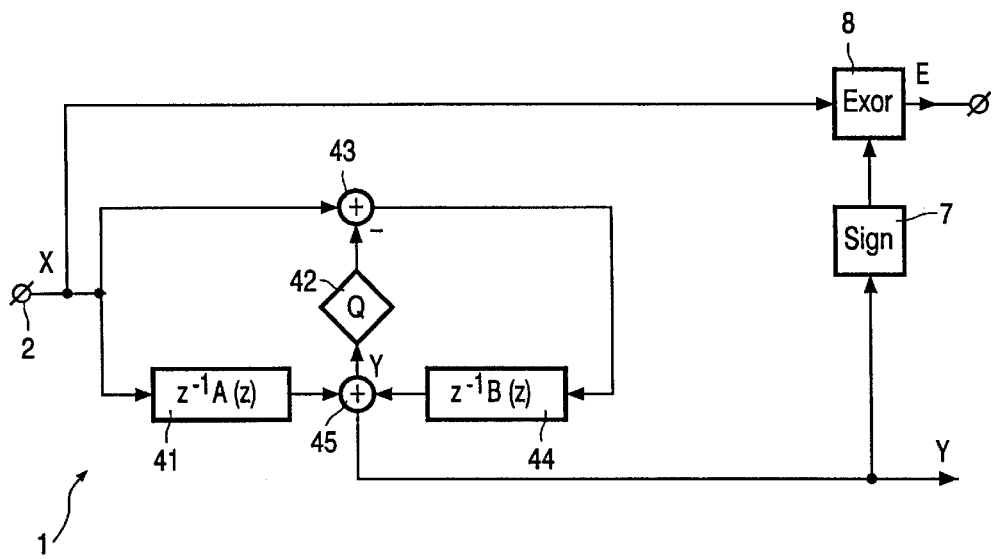

FIG. 5 diagrammatically shows an example of a filter device for 1 bits signals according to the invention in which the secondary filter devices are Infinite Impulse Response (IIR) filters.

Figure 6:
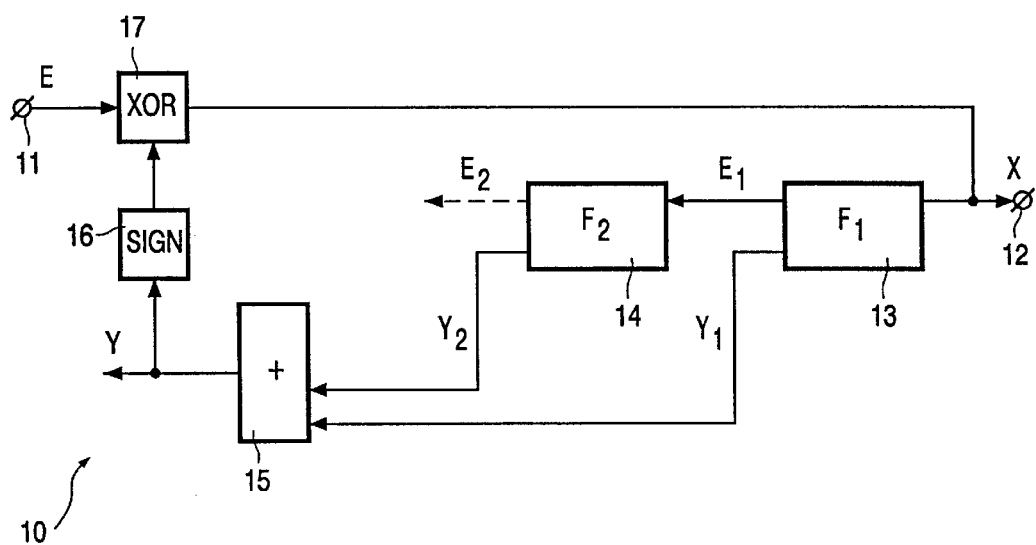

FIG. 6 diagrammatically shows a scheme of an example of a filter device for 1 bit signals according to the invention.

Figure 7:
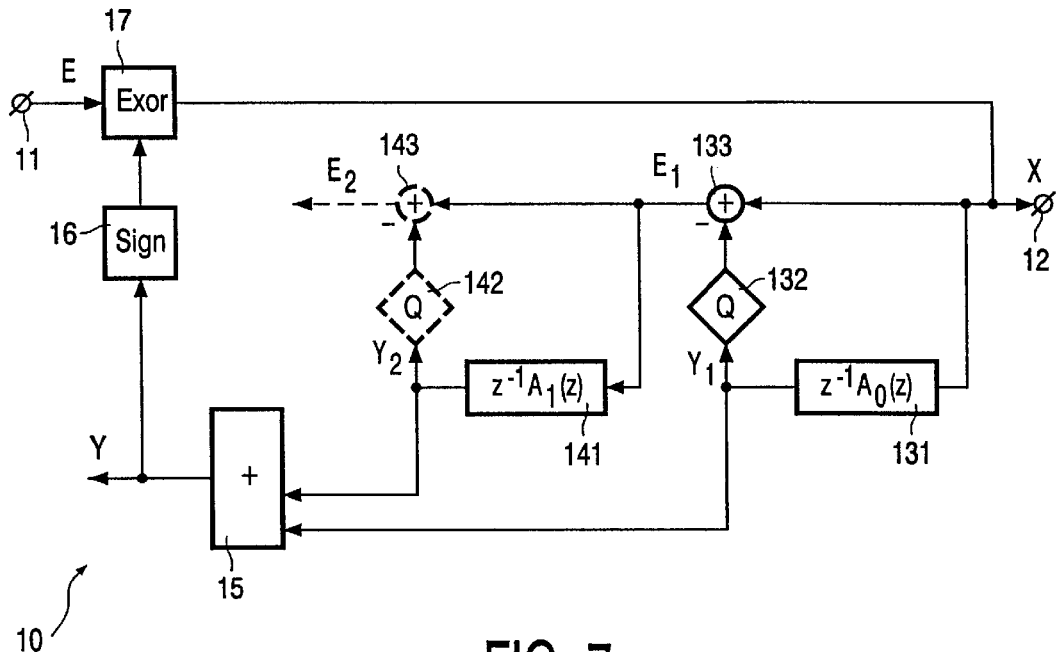

FIG. 7 diagrammatically shows an example of a filter device for 1 bits signals according to the invention in which the secondary filter devices are Finite Impulse Response (FIR) filters.

Figure 8:
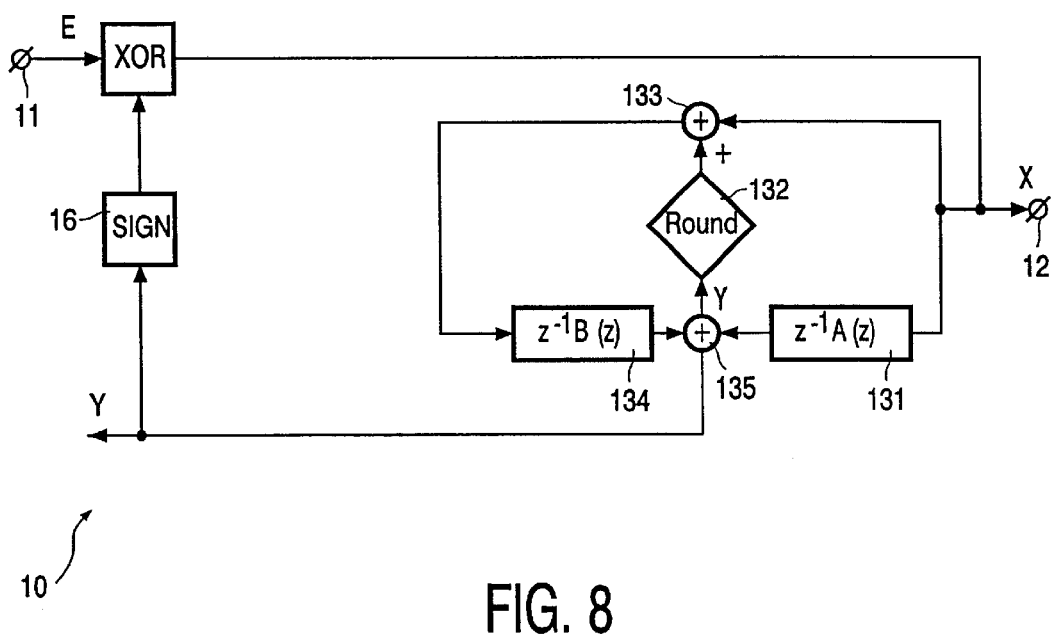

FIG. 8 diagrammatically shows an example of a filter device for 1 bits signals according to the invention in which the secondary filter devices are Infinite Impulse Response (IIR) filters.

Figure 9:
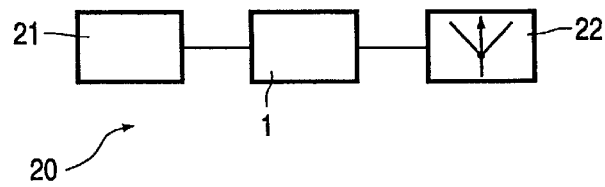

FIG. 9 diagrammatically shows a data transmission device provided with a prediction coder device according to the invention.

Figure 10:
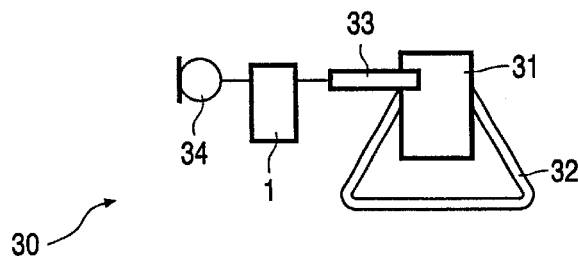

FIG. 10 diagrammatically shows a data storage device provided with a prediction coder device according to the invention.

Figure 11:
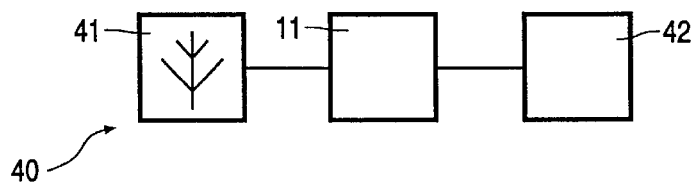

FIG. 11 diagrammatically shows a data processing device provided with a prediction decoder device according to the invention.

Figure 12:
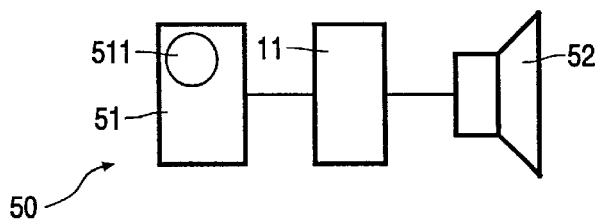

FIG. 12 diagrammatically shows an audio-visual device provided with a prediction decoder device according to the invention.

Figure 13:
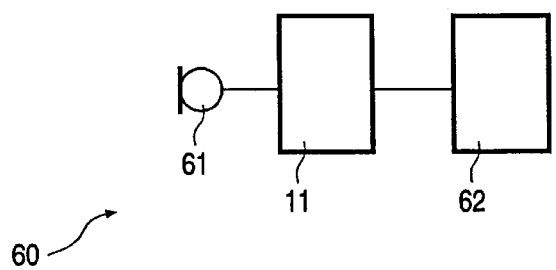

FIG. 13 diagrammatically shows an audio-visual recorder device provided with a prediction decoder device according to the invention.

Figure 14:
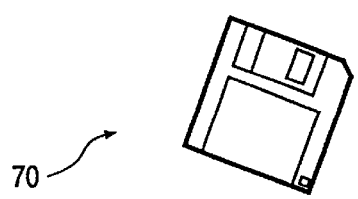

FIG. 14 diagrammatically shows a data container device provided with a prediction coding method according to the invention.

In the following description, prediction filtering or coding methods and prediction filter or coder devices according to the invention will be described as an example of filtering methods and devices according to the invention. However, it should be apparent that the invention can be applied to any filtering method or a filtering device and is not limited to prediction coding methods or prediction coder devices. In the following, x is a positive integer. As can be seen from FIG. 1, a method for prediction encoding an x-bit signal according to the invention is started by receiving a digital input signal X(t). Based on n stored preceding input signals X(t−1), X(t−2), X(t−3), . . . , X(t−n) a primary filtered signal, being a primary prediction signal, Y(t) of the input signal is formed in blocks I–VII. Since this primary prediction signal is based on n preceding signals it is called a n-th order primary prediction signal. For the sake of clarity it is noticed that in this application the order n of a filtering step does not necessarily mean linear filtering with a polynomial of order n.

After forming an n-th order primary prediction signal, the n-th order primary prediction signal Y(t) is rounded in step VIII to a certain number of bits. The lsd of the primary rounded signal, from hereon called the n-th order primary rounded signal, Ŷ(t) resulting from the rounding step VIII has to be at least as significant as the lsd of the input signal X(t) in order to prevent the coded signal to have less significant lsd's. Therefor, the secondary prediction signal has to be rounded to a certain lsd. However, this rounding causes a distortion of the prediction error or coded signal, whereby subsequent prediction of the distorted prediction error or coded signal by a next secondary filter is disturbed.

After the rounding step VIII an n-th order primary prediction error or coded signal E(t) is calculated in step IX. This n-th order primary prediction error or coded signal is obtained by combining the n-th order primary rounded signal Ŷ(t) from the input signal X(t).

Figure 1:
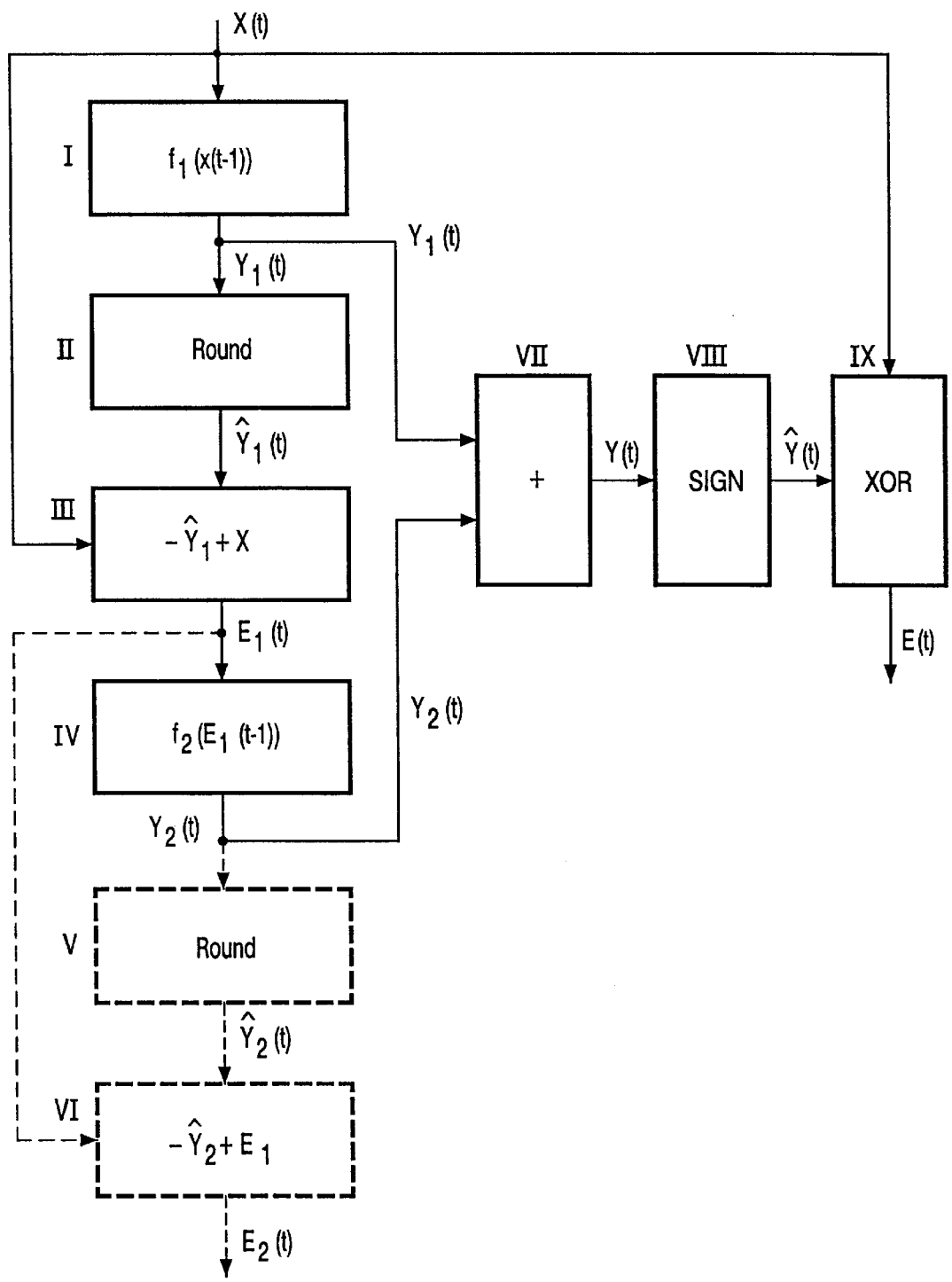
FIG. 1 shows a flow chart illustrating an example of a preferred filtering method according to the invention.

In the example shown in FIG. 1, the input signal is a 1 bit signal, so x is 1. A single bit signal is often used for audio signals, like music to be stored on a Super Audio Compact Disc (SACD). In case of a 1 bit input signal, the rounding step VIII may be a SIGN operation as will be explained below and the subtracting operation IX may be an exclusive or (XOR) operation.

However, it should be apparent that the invention is not limited to any size of the input signal nor is the invention limited to any size of the rounded signal.

In this example of a method according to the invention the n-th order primary prediction step I–VI is divided in two secondary filtering steps, steps I–III, steps IV–VI respectively. These filtering steps are lower order prediction steps. In the shown example the n-th order prediction step I–VI is divided in a first $m_1$-th order secondary prediction step I–III and a second $m_2$-th order secondary prediction step IV–VI, the secondary prediction steps satisfy the condition $n=m_1+m_2$ As a source signal for the first secondary filtering step or $m_1$-th order step, the input signal X(t) is taken. Based on the latest $m_1$ preceding input signals X(t−1), . . . , X(t−$m_1$) a first secondary filtered signal being an $m_1$-th order prediction signal $Y_1(t)$ of the input signal X(t) is calculated in first secondary predicting step I. The $m_1$-th order prediction signal $Y_1(t)$ is calculated with the general formula $Y_1=f_1(X(t-1), \ldots , (X(t-m_1))$. In this formula $f_1$ can be any prediction formula, as long as it predicts X(t) based on X(t−1), . . . , X(t−$m_1$) only. Various prediction formulas are known in the art, but it should be apparent that the invention is not limited to a specific prediction formula but applies to the prediction coding principle in general. For example, it is also possible to apply a so called inter-channel prediction filter, whereby a prediction of the input signal X(t) is made based on preceding values of a different signal, like a second input signal.

After first secondary predicting step I the $m_1$-th order prediction signal $Y_1(t)$ is rounded in rounding step II to a first secondary $m_1$-th order rounded signal $\hat{Y}_1(t)$. This rounded signal has a certain lsd, which can be any lsd required by the specific design. However, it is advantageous if the least significant digit of the first secondary rounded signal $\hat{Y}_1(t)$ is of less significance than the least significant digit of the input signal X(t).

After rounding step II, a first $m_1$-th order secondary prediction error $E_1(t)$ is calculated in step III. This combining or calculation step III is performed by subtracting the first $m_1$-th order secondary rounded signal $\hat{Y}_1(t)$ from the input signal X(t). However, it is should be apparent that other methods for obtaining the prediction error are possible.

After the first $m_1$-th order secondary prediction step I–III, a second $m_2$-th order secondary prediction is performed in steps IV–VI. As a source signal the first $m_1$-th order secondary prediction error $E_1(t)$ is used. Based on a latest preceding first $m_2$-th order prediction error $E_1(t-1), \ldots , t-m_2$) a second $m_2$-th order secondary prediction signal $Y_2(t)$ is calculated in step IV with a second secondary prediction formula $f_2(E_1(t-1), \ldots , E_1(t-m_2))$.

Again, it should be noted that various prediction formulas are known in the art and that the invention is not limited to a specific prediction formula but applies to (prediction) filtering in general. It should also be apparent that this second secondary prediction formula does not need to be the same formula as the first secondary prediction formula.

Since this first $m_1$-th order secondary prediction error $E_1(t)$ is based on the $m_1$ latest preceding input signals X(t−1), . . . , X(t−$m_1$), an $m_2$-th order prediction of the first $m_1$-th order secondary prediction error $E_1(t)$ will be a $m_1+m_2$-th order prediction of X(t) or in mathematical formula:

$$Y_2(t) = f_2[E_1(t-1), \ldots , E_1(t-m_2)]$$
$$= f_2[\hat{Y}_1(t-1) - X(t-1), \ldots , \hat{Y}_1(t-m_2) - X(t-m_2)]$$
$$= f_2[Round(Y_1(t-1)) - X(t-1), \ldots , Round(Y_1(t-m_2)) - X(t-m_2)]$$
$$= f_2[Round(f_1(X(t-2), \ldots , f_1(X(t-m_1-1))) - X(t-1), \ldots ,$$
$$Round(f_1(X(t-m_2-1), \ldots , f_1(X(t-m_1-m_2))) - X(t-m_2)].$$

The n-th order prediction step I–VII is a $m_1+m_2$-th order prediction, Therefor, it is not necessary to calculate the second $m_2$-th order secondary rounded signal $\hat{Y}_2(t)$ or the second $m_1$-th order secondary prediction error $E_2(t)$. If, however the n-th order prediction would be of higher order than $m_1+m_2$ (n>$m_1+m_2$) or if the second $m_2$-th order secondary prediction error $E_2(t)$ is required by a further process, the second $m_2$-th order secondary rounded signal $\hat{Y}_2(t)$ or the second $m_2$-th order secondary prediction error $E_2(t)$ can be calculated, as is indicated by the dotted steps V–VI. The second $m_2$-th order secondary prediction signal $Y_2(t)$ is then rounded in second secondary rounding step V to a second $m_2$-th order secondary rounded signal $\hat{Y}_2(t)$ of a certain bit size. Like the bit size of the first $m_1$-th order rounded signal $\hat{Y}_1(t)$, this bit size can be any size required by the specific application, but it is advantageous if the lsd of second $m_2$-th order secondary rounded signal $\hat{Y}_2(t)$ is less significant than the lsd of the input signal X(t). It should be noted though, that there is no necessity to round the second $m_2$-th order prediction signal to the size of the first $m_1$-th order rounded signal $\hat{Y}_1(t)$.

After rounding step V, a second $m_2$-th order secondary error is calculated by subtracting the second $m_2$-th order secondary rounded signal $\hat{Y}_2(t)$ from the first $m_1$-th order secondary error $E_1(t)$ in step VI.

Both secondary prediction signals $Y_1(t)$ and $Y_2(t)$ are added in adding step VII and the resulting signal is n-th order primary prediction signal Y(t). This n-th order primary prediction signal Y(t) has to be compared to the input signal X(t) itself. However, the n-th order primary prediction signal Y(t) is not necessarily of the same bit size x. Therefore, the n-th order primary prediction signal Y(t) is first rounded to a n-th order primary rounded signal $\hat{Y}(t)$. Since in this example X(t) is a 1 bit signal, the primary rounding VIII can be a SIGN operation. Such SIGN operation returns a 1 if the n-th order primary prediction signal Y(t) is positive or zero and a 0 if the n-th order primary prediction signal Y(t) is negative. For the sake of clarity, it is observed that a bit of a 1-bit audio signal is in reality not either 0 or 1 but represents in fact either 1 (positive) or −1 (negative).

After primary rounding step VIII, the n-th order prediction error is calculated by subtracting the n-th order primary rounded signal $\hat{Y}(t)$ from the input signal X(t). Since the input signal is a 1 bit signal, as a subtracting operation IX a simple XOR operation is used.

As is mentioned, the m-th order prediction f(X(t−1), ..., X(t−m)) can be of any kind. The m-th order can for example be a Finite Impulse Response (FIR) method. In such a FIR method the delayed samples of the input signal multiplied by a respective coefficient $a_i$, are added and next subtracted from the input signal X(t) so in this case the first $m_1$-th order secondary prediction error is:

$$E_1(t) = X(t) - Round\left[\sum_{i=1}^{m_1} a_i X(t-i)\right].$$

In such case the invention provides advantages if the order n of the n-th order filter is larger than one. If a recursive or Infinite Impulse Response (IIR) method is used, then also delayed and weighted samples of the output signal, i.e. the prediction error, are subtracted from to the input signal X(t), so the first secondary prediction error will be:

$$E_1(t) = X(t) - Round\left[\sum_{i=1}^{m_1} a_i X(t-i) + \sum_{i=1}^{m_1} b_i E_1(t-i)\right] - X(t).$$

Figure 2:
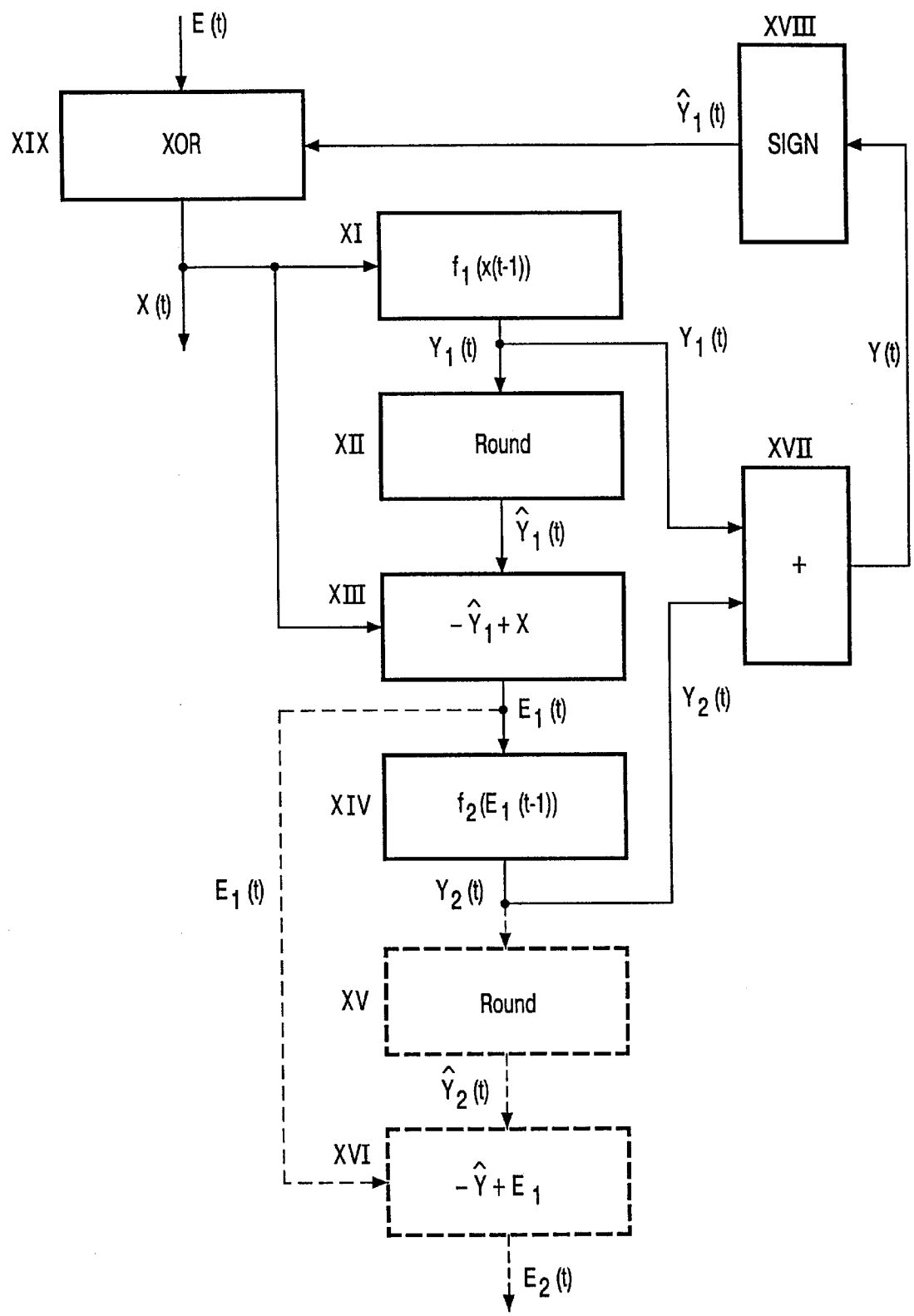
FIG. 2 shows a flow chart illustrating an example of a preferred filtering method according to the invention.

In this formula the upperlimits $m_1$ are the same, however it is equally possible to choose different upperlimits for both parts. If an Infinite Impulse Response (IIR) method is used, the invention can already advantageously be applied to a filter structure with a single secondary filtering step, because it is possible to use any rounding process in a process involving the above formula and extract the first secondary filtered signal to calculate the primary filter error to be used as the coded signal. FIG. 2 shows a flow diagram of an example of a filtering method reverse to the filtering method shown in FIG. 1. The filtering method in FIG. 2 is a method for decoding an n-th order prediction coded signal with $n=m_1+m_2$. In the example shown in FIG. 2 the coded signal E(t) of FIG. 1 is used as input signal. Decoding the input signal is achieved by adding in step XIX an n-th order primary rounded signal $\hat{Y}(t)$ to the x-bit input signal E(t). This results in a decoded signal X(t). Since the input signal is a 1 bit signal, the adding step XIX can be performed by a simple XOR operation. The n-th order primary rounded signal Y(t) is obtained by predicting in steps XI–XVII an n-th order primary prediction signal Y(t) of the decoded signal X(t) based on n latest preceding decoded signals X(t−1), X(t−2), X(t−3), ..., X(t−n) and primary rounding in step XVIII the n-th order primary prediction signal Y(t) to the n-th order primary rounded signal $\hat{Y}(t)$.

In the shown example the step of calculating an n-th order primary prediction signal includes several steps XI–XVII. First, a first $m_1$-th order secondary prediction signal $Y_1(t)$ is formed in first secondary prediction step XI based on a latest preceding source signal X(t−1), ..., X(t−$m_1$). The formula $f_1$ used to make this prediction is essentially the same as formula $f_1$ used in FIG. 1.

Thereafter, in secondary rounding step XII rounding of the first $m_1$-th order secondary prediction signal is performed. This secondary rounding step XII results in a first $m_1$-th order secondary rounded signal $\hat{Y}(t)$. The least significant digit of this secondary rounded signal $\hat{Y}_1(t)$ should be at most as significant as the least significant digit of the input signal, as is explained before with regard to the first $m_1$-th order secondary rounding step II. Furthermore, it is advantageous if this rounding step is substantially similar to the rounding step II, because this enables a lossless coding process.

After first secondary rounding, a first secondary subtracting step XIII is performed. In this secondary subtracting step XIII, the decoded signal X(t) is subtracted from the first $m_1$-th order secondary rounded signal $\hat{Y}(t)$, whereby a first $m_1$-th order secondary prediction error $E_1(t)$ is calculated. This first $m_1$-th order secondary prediction error is used as a source signal for a second $m_2$-th order secondary prediction step XIV–XVI.

Based on the latest preceding first $m_2$-th first secondary prediction error signals $E_1(t-1, ..., t-m_1)$ a second $m_2$-th order secondary prediction signal $Y_2(t)$ of the first $m_1$-th order secondary prediction error $E_1(t)$ is made in step XIV. The formula $f_2$ used to make this prediction is essential the same formula $f_2$ as used in FIG. 1.

Since the n-th order primary prediction step I–VII is a $m_1+m_2$-th order prediction it is not necessary to calculate the second $m_2$-th order secondary rounded signal $\hat{Y}_2(t)$ or the second $m_2$-th order secondary prediction error $E_2(t)$. If, however the n-th order primary prediction would be of higher order than $m_1+m_2$ (n>$m_1+m_2$) or the second $m_2$-th order secondary prediction error $E_2(t)$, is required by a further process, the second $m_2$-th order secondary rounded signal $\hat{Y}_2(t)$ or the second $m_2$-th order secondary prediction error $E_2(t)$ can be calculated, as is indicated by the dotted steps XV–XVI.

If the n-th order primary prediction is of an order larger than $m_1+m_2$, the second $m_2$-th order secondary prediction signal $Y_2(t)$ is rounded to a second $m_2$-th order rounded secondary prediction signal $\hat{Y}_2(t)$ in step XV. The lsd of this second $m_2$-th order secondary rounded signalis is at most as significant as the lsd of the input signal X, otherwise the method would not be advantageous compared to the state of the art as is explained above with regard to the coding method.

After secondary rounding step XV, the second $m_2$-th order secondary rounded prediction signal $\hat{Y}_2(t)$ is subtracted from the first secondary prediction error whereby a second $m_2$-th order secondary prediction error $E_2(t)$ is calculated.

Both secondary prediction signals $Y_1(t)$ and $Y_2(t)$ are added in step XVII, to obtain a n-th order primary prediction signal Y(t).

This n-th order primary prediction signal Y(t) is rounded in step XVIII such that the significance of the lsd is at least the significance of the lsd of the signal X(t). In this case x=1, so a simple SIGN operation can be applied to the n-th order primary prediction signal, as explained before. This SIGN operation results in a n-th order primary rounded signal Ŷ(t).

The source signal, in the current example the coded signal E(t), is added to the n-th order primary rounded signal in step XIX whereby a decoded signal is obtained that is the same as the input signal X(t) of FIG. 1. In this example for the adding step a simple XOR operation can be used, since the signal is a 1 bit signal, as explained previously.

In the example shown in FIG. 2, the input signal is a 1-bit signal, the step of primary rounding the n-th order primary prediction signal is a SIGN operation, and the step of calculating an n-th order primary prediction error is an exclusive OR operation, but the invention is of course not limited to the described example size of the signals and these types of rounding step and calculating step are given as a possible example only.

In FIG. 3 as example of a filter device according to the invention a prediction coder device 1 is shown. This prediction coder device 1 includes an input port 2 for receiving the input signal X(t) and an output port 3 for transmitting the primary prediction error or coded signal E(t). Between input port 2 and output port 3 a primary filter structure or primary prediction structure 4–8 is provided which includes: a primary filter device, being an n-th order primary prediction device 4–6; a primary rounder device 7; and a primary combining device being subtractor device 8.

The example primary filter device shown in FIG. 3 is a primary prediction coder device 1 for coding a 1 bit signal, therefor the primary rounder device 7 is a SIGN device, performing the above described SIGN operation and the primary subtractor device 8 is a XOR gate as is commonly used in the art The n-th order primary prediction device is provided with a first moth order secondary prediction device 4 and a second $m_2$-th order secondary prediction device 5. Both devices calculate a secondary prediction signal $Y_1(t)$, $Y_2(t)$ based on a latest preceding source signal $X(t-1, \ldots, t-m_1)$, $E_1(t-1, \ldots, t-m_2)$ and calculate a secondary prediction error $E_1(t)$, $E_2(t)$ respectively by subtracting the first order prediction signal $Y_1(t)$, $Y_2(t)$ from the respecting source signals $X(t)$, $E_1(t)$ The second $m_2$-th order secondary prediction device does not need to include the secondary subtractor device nor does it need to include the secondary rounder device, since the second $m_2$-th order secondary prediction error $E_2(t)$ is not used in any further process. If however, the second $m_2$-th order secondary prediction error $E_2(t)$ is required in further processes or the n-th order prediction filter is of a higher order than $m_1+m_2$ the second $m_2$-th order secondary prediction device can be provided with the subtractor device and the rounder device, as is indicated in FIGS. 3–5 with the dotted line.

The secondary prediction signals $Y_1(t)$, $Y_2(t)$ are added by adder 6 to obtain a n-th order primary prediction signal Y(t). This primary prediction signal Y(t) is rounded by primary rounder device 7 to the bit size of the input signal X(t). In the example shown in FIG. 3, the input signal X(t) is a single bit signal, therefore the primary rounder device 7 can be a simple SIGN device performing the previously describe SIGN operation. The output signal of the primary rounder device is a n-th order primary rounded signal Ŷ(t). This n-th order primary rounded signal Ŷ(t) is transmitted to primary subtractor device 8, which subtractor device subtracts the n-th order primary rounded signal Ŷ(t) from the input signal X(t). This results in a n-th order primary prediction error E(t). Since both the n-th order primary rounded signal Ŷ(t) and the input signal X(t) are single bit signals, the shown primary subtractor device is a XOR gate as is commonly known in the digital electronics art.

The secondary filter device 4 can be any type of prediction means. If, however FIR prediction devices are used as secondary filter device 4, 5 the prediction coder device 1 shown in FIG. 3 will look like the prediction coder device 1 shown in FIG. 4.

In FIG. 4, the FIR prediction device 41, 51 includes $m_1$-th, $m_2$-th order prediction means 41, 51 that predict the $m_1$-th, $m_2$-th order prediction signal $Y_1(t)$, $Y_2(t)$. To predict these prediction signals any mathematical formula can be used, as long as this formula makes a prediction based on $m_1$, $m_2$ latest preceding source signals $X(t-1), X(t-2), X(t-3), \ldots, X(t-m_{1, 2})$. In this case of a $m_1$-th, $m_2$-th order secondary prediction device the prediction will be made based on $m_1$, $m_2$ latest preceding source signal $X(t-1, \ldots t-m_{1, 2})$, $E_1(t-1, \ldots, t-m_{1, 2})$. Connected to the $m_1$-th order secondary prediction device 41, 51 is a secondary rounder device 42, 52. This rounder device 42, 52 rounds the $m_1$-th order secondary prediction signal $Y_1(t)$, $Y_2(t)$ to a $m_1$-th order secondary rounded signal $\hat{Y}_1(t)$, $\hat{Y}_2(t)$ of a certain least significant digit (lsd). In contrast to the rounding of the primary rounder device 7, this lsd can be of any significance appropriate in the prediction coder device design, but in order to overcome the problems described previously it should be of at most the significance of the lsd of the input signal X(t).

For the sake of clarity, it is observed that the second $m_1$-th order secondary prediction device does not need to include the devices indicated with dotted lines in the FIGS. 3–5.

A special example of a prediction coding device 1 embodying the invention is shown in FIG. 5. In this example a IIR secondary prediction filter device 4 is applied in a secondary filter device 1. The IIR prediction device 4 has prediction means 41 which predicts a forward prediction signal on the basis of the preceding input signals $X(t-1, \ldots, t-n)$ and recursive prediction means 44 which predicts a recursive prediction signal on the basis of preceding prediction errors $E_1(t, \ldots t-n)$.

The forward and the recursive prediction signals are added by adder 45 to secondary prediction signal Y(t). This adder 45 transmits the prediction signal Y(t) to secondary rounder device 42 that may be similar to the rounder device 42 shown in FIG. 4, and the adder also transmits the secondary prediction signal Y(t) to primary rounder device 7, which may be a SIGN device, similar to the primary rounder device 7 in FIG. 4.

The first primary rounded signal Ŷ(t) resulting from the SIGN operation is transmitted to the XOR gate 8, which subtracts the this rounded signal Ŷ(t) from the input signal X(t), whereby a primary prediction error E(t) is obtained.

FIG. 6 diagrammatically shows as a filter device according to the invention a decoder device 10 for decoding of encoded signals. Decoder device 10 includes: an input port 11, for receiving an x-bit input signal E(t); a primary adder device 17 connected to the input port 11, for calculating a decoded signal by adding an n-th order primary rounded signal Ŷ(t) to the input signal E(t); an n-th order primary prediction device 13–15 connected to the primary adder device for calculating an n-th order primary prediction signal Y(t) of a decoded signal X(t) based on n latest preceding decoded signals $X(t-1), X(t-2), X(t-3), \ldots, X(t-n)$; a primary rounder device 16 connected to the n-th order prediction device 13–15 and an adder device 17, for rounding the n-th order primary prediction signal Y(t) to the n-th order primary rounded signal Ŷ(t), whereby the n-th order primary rounded signal has a lsd of at least the significance of the lsd of the input signal E(t).

The decoder device further includes an output port 12 connected to the primary adder device 17 for transmitting the decoded signal X(t). The n-th order primary prediction device 13–15 includes two $m_1$-th order secondary prediction devices 13, 14, satisfying the relationship $\Sigma m_1 = n$.

In the example shown, m is 1 for both m-th order secondary prediction devices 13, 14. Each of the m-th order secondary prediction devices 13, 14 predicts an m-th order secondary prediction signal $Y_1(t)$, $Y_2(t)$ based on m latest preceding source signals X(t−1), X(t−2), X(t−3), . . . , X(t−m); $E_1$(t−1), $E_1$(t−2), $E_1$(t−3), . . . , $E_1$(t−m). The m-th order secondary prediction devices 13, 14 also calculate an m-th order secondary prediction error $E_1(t)$, $E_2(t)$ serving as a source signal for the next m-th order secondary prediction device. Since the second m-th order secondary prediction device does not have a next m-th order secondary prediction device, the second m-th order secondary prediction error $E_2(t)$ does not need to be calculated unless secondary prediction error $E_2(t)$ is required in further processes, as is indicated in FIG. 6. with a dotted arrow.

The m-th order secondary prediction signals $Y_1(t)$, $Y_2(t)$ are added by an primary adder device 15 connected to all m-th order secondary prediction devices 13, 14. This adding operation results in the n-th order primary prediction signal Y(t) which is rounded by the primary rounder device 16.

FIG. 7 shows an example of a decoder device whereby the m-th order secondary prediction devices are FIR prediction devices 13, 14. These secondary devices comprise forward secondary prediction means 131, 141 predicting an $m_{1,2}$-th order prediction signal $Y_1(t)$, $Y_2(t)$, based on $m_{1,2}$ latest preceding source signals. The $m_{1,2}$-th order secondary prediction signals $Y_1(t)$, $Y_2(t)$ are rounded by m-th order secondary rounder devices 132, 142 to an m-th order secondary rounded signal $\hat{Y}_1(t)$, $\hat{Y}_2(t)$ of with a certain lsd. In contrast to the rounding of the n-th order primary rounder device 16, said lsd may be of any significance appropriate in the device design, but in order to overcome the disadvantages of the state of the art described above it should preferably be of at most the significance of the input signal X(t).

The m-th order secondary rounded signal $\hat{Y}_1(t)$, $\hat{Y}_2(t)$ is subtracted from the source signal X(t), $E_1(t)$ by secondary subtractor device 133, 143. By this subtracting step secondary prediction error signals $E_1(t)$, $E_2(t)$ are obtained, that may be used as a source signal for a next m-th order secondary prediction device.

For the sake of clarity, it is observed that the second m-th order prediction device does not need to include the secondary subtractor device 143 and the secondary rounder device 142, as is indicated with the dotted lines in FIGS. 6 and 7.

FIG. 8 diagrammatically shows an example of a filter device for 1 bits signals according to the invention in which the secondary filter devices are Infinite Impulse Response (IIR) filters. The secondary device is similar to the FIR device but is further provided with recursive secondary prediction means 134 that predict a recursive secondary prediction signal based on a latest secondary preceding prediction error $E_1$(t−1, . . . , t−m). The forward m-th order secondary prediction signal is added to this secondary recursive prediction signal by a secondary adder device 135, whereby a m-th order secondary prediction signal $Y_1(t)$ is obtained. This m-th order secondary prediction signal is transmitted to secondary rounder device 132, which may be similar to the secondary rounder device 132 in FIG. 7 and the secondary prediction signal is also transmitted to SIGN device 16, where after the n-th order primary decoding device is the same as the decoding device shown in FIG. 7.

The invention can advantageously be applied in various devices, for example a data transmission device 20, like a radio transmitter or a computer network router that includes input signal receiver means 21 and transmitter means 22, for example an antenna, for transmitting a coded signal can be provided with a prediction coder device 1 according to the invention that is connected to the input signal receiver means 21 and the transmitter means 22, as is shown in FIG. 9. Such a device is able to transmit a large amount of data using a small bandwidth since the data is compressed by the coding process. It is equally possible to apply a prediction coding device 1 according to the invention in a data storage device 30, like a SACD burner, DVD burner or a Mini Disc recorder, for storing data on a data container device 31, like a SACD, a DVD, a compact disc or a computer hard-drive. Such a device 30 includes holder means 32 for the data container device 31, writer means 33 for writing data to the data container device 31, input signal receiver means 34, for example a microphone and a prediction coder device 1 according to the invention that is connected to the input signal receiver means 34 and the writer means 33, as is shown in FIG. 10. This data storage device 30 is able to store more data on a data container device 31, while disadvantages of the known data storage devices are circumvented.

It is equally possible to provide a data processing device 40 including input signal receiver means 41, like a DVD-rom player and data process means 42 with a decoder device 11 for prediction encoded signals according to the invention, as is shown in FIG. 11. Such a data processing device 40 might be a computer or a television set-top box.

It is also advantageous to provide an audio device 50 like a home stereo or multi-channel player, including data input means 51, like a audio CD player, and audio output means 52, like a loudspeaker, with a decoder device 11 for prediction encoded signals according to the invention, as is shown in FIG. 12. This is especially advantageous if the audio device 50 is able to play SACD because it is provided with SACD player means 511, since the described method does comply with the Super Audio CD standard and allows to provide a SACD with more audio data than the commonly available discs, thereby enhancing the quality of the output. Similarly, an audio recorder device 60, as shown in FIG. 13, including audio input means 61, like a microphone, and data output means 62 can be provided with a prediction coder device 11 thereby allowing to record more data while using the same amount of data storage space.

Furthermore, the invention can be applied to data being stored to a data container device like floppy disk 70 shown in FIG. 14, such a data container device might for example also be a Digital Versatile Disc or Super Audio CDs itself or a master or stamper for manufacturing such DVDs or SACDs.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, a filtering method is proposed wherein first several filtering steps are made. Each step includes: generating a filtered signal, rounding this filtered signal to a certain accuracy and combining the rounded signal with the input signal, whereby a filter error is obtained. The filtered signals are combined to a first filtered signal that is rounded and combined with the input signal, whereby a coded signal is obtained. This allows to adapt the rounding step and the combining step in each filtering step to the specific filter design. Thereby limit cycles are reduced, the first filtered signal is available for further processes and the rounding can be inverted in the reverse process. Further a filter method for the reverse process, filter devices able to perform these methods and devices containing such devices are provided.

What is claimed is:

1. A filtering method, including the steps of:
   generating (I–VII) a first filtered signal of an input signal;
   rounding (VIII) said first filtered signal to a first rounded signal; and
   combining (IX) said first rounded signal with said input signal for calculating a first filter error or coded signal;
   characterised in that,
   the step of generating (I–VII) said first filtered signal includes:
   at least one filtering step (I–III,IV–VI) including the steps of:
   generating (I,IV) a second filtered signal of a source signal;
   rounding (II,V) said second filtered signal to a second rounded signal; and
   combining (III, VI) said second rounded signal with said source signal for calculating a second filter error.

2. A method as is claimed in claim 1, wherein the step of generating (I–VII) said first filtered signal further includes:
   a last filtering step (IV) including only: the step of generating (IV) a last second filtered signal of a last second source signal.

3. A method as is claimed in claim 1, wherein the step of generating (I–VII) said first filtered signal includes:
   at least two filtering steps, and
   the step of generating (I–VII) said first filtered signal further includes: combining (VII) second filtered signals in order to obtain said first filtered signal.

4. A method as claimed in claim 1, wherein the method is a prediction filtering method, wherein said step of generating (I–VII) a first filtered signal is a prediction filter step for generating a first prediction signal of said input signal, and the steps of generating a second filtered signal (I–III,IV–VI) are prediction filtering steps for generating a second prediction signal of said source signal based on preceding source signals.

5. A method as claimed in claim 1, wherein said second filtered signal is rounded to a second rounded signal with at least the accuracy of the least significant digit of said first rounded signal.

6. A method as claimed in claim 5, wherein in said step of rounding said first filtered signal, said first filtered signal is rounded to a first rounded signal with at most the accuracy of the least significant digit of the input signal.

7. A method as claimed in claim 1, wherein the step of predicting a second prediction signal (I,IV) is performed with a Finite Impulse Response method.

8. A method as claimed in 1, wherein the step of predicting a second prediction signal (I,IV) is performed with an Infinite Impulse Response method.

9. A method as claimed in claim 1, in which filtering steps (I–III,IV–VI) the second filter error of a preceding repetition (I–III) is used as the source signal for a following filtering step (IV–VI), and said input signal is used as a source signal for a first filtering step (I–III) of generating a second filtered signal.

10. A method as claimed in claim 1, wherein said input signal is a 1-bit signal, the step of rounding (VIII) said first prediction signal is a SIGN operation, and the step of calculating (IX) the first prediction error or coded signal is an Exclusive OR operation.

11. A signal filtered with a method as claimed in claim 1.

12. A data container device (70) containing data representing signals filtered with a method as claimed in claim 1.

13. A filtering method, including the steps of:
    combining (XIX) a first rounded signal with an input signal for calculating an output signal;
    generating (XI–XVII) a first filter signal of said output signal; and
    rounding (XVIII) said first filter signal to said first rounded signal,
    characterised in that,
    the step of generating said first filter signal includes:
    at least one filtering step (XI–XII,XIV–XVI) including the steps of:
    generating (XI, XIV) a second filter signal of a source signal;
    rounding (XII, XV) said second filter signal to a second rounded signal; and
    combining (XIII, XVI) said second rounded signal with said source signal for calculating a second filter error.

14. A filter device (10), including:
    an input port (11), for receiving an input signal;
    a first combining device (17) connected to said input port (11), for calculating an output signal by combining a first rounded signal with said input signal;
    a filter structure (13–16) including:
    a first filter device (13–15) connected to said first combining device (17) for generating a first filtered signal; and
    a first rounder device (16) connected to said first filter device (13–15) and said first combining device (17), for rounding said first filtered signal to said first rounded signal;
    said filter device (10) further including an output port (12) connected to said first combining device (17),
    characterised in that,
    said first filter device (13–15) includes at least one second filter device (13,14) including:
    second filter means (131,141) for generating a second filtered signal of a source signal;
    a second rounder device (132,142) connected to said second filter means (131,141), for rounding said second filtered signal to a second rounded signal; and
    a second combining device (133,143) connected to said second rounder device (132,142) for calculating a second filter error by combining said source signal with said second rounded signal.

15. A filter device as is claimed in claim 14, wherein said first filter device further includes a last second filter device

(14) including only last second filter means (141) for generating a last second filtered signal of a source signal.

16. A filter device (10) as claimed in claim 15, wherein the second prediction means of a second prediction device are connected to the second combining device of a preceding second prediction device, and second prediction means of a first second prediction device are connected to said input port.

17. A filter device as is claimed in claim 14, wherein said filter device (13–15) includes at least two second filter devices (13,14), and said first filter device (13–15) includes a third combining device (15) connected to said second filter means (131,141) of said second filter devices (13,14) for obtaining a first filtered signal by combining second filtered signals, said third combining device (15) being connected to said first rounder device (16).

18. A filter device (10) as claimed claim 14, wherein said filter device is a prediction filter device, said filter structure is a prediction filter structure, said first and second filter devices are prediction filtering devices and said second filter means are prediction filtering means and said input signal is a prediction filtered signal.

19. A filter device (10) as claimed in claim 14, wherein said second rounder device has at least a rounding accuracy of the least significant digit of said first rounded signal.

20. A filter device (10) as claimed in claim 19, wherein said first rounder device has at most the rounding accuracy of the least significant digit of the input signal.

21. A filter device (10) as claimed in claim 14, wherein said second filter means are Finite Impulse Response filter means.

22. A filter device (10) as claimed in claim 14, wherein said second filter means are Infinite Impulse Response filter means.

23. A filter device (10) as claimed in claim 14, wherein said input signal is a 1-bit signal, said first rounder device is a SIGN device, and said combining device is an Exclusive OR device.

24. A data processing device (40) including input signal receiver means (41), data processing means (42) and a filter device (10) as claimed in 12 connected to the input signal receiver means (41) and the data processing means (42).

25. An audio-visual device (50), including data input means (51), audio-visual output means (52) and a filter device (11) as claimed in claim 14.

26. A filter device (1) including:
an input port (2), for receiving an input signal,
a filter structure (4–8) connected to the input port (2) including:
an first filter device (4–6) for generating a first filter signal of said input signal,
a first rounder device (7) connected to said first filter device, for rounding the first filter signal to a first rounded signal, and
a first combining device (8) connected to said rounder device and the input port, for calculating a first filter error or coded signal by subtracting the first rounded signal from said input signal, and
the filter device (1) also including an output port (3) connected to said first combining device (8),
characterised in that,
said first filter device (4–6) includes:
at least one second filter device (4,5), including:
second filter means (41,51) for generating a second filter signal of a source signal based on a latest preceding source signal;
a second rounder device (42,52) connected to the second filter means (41,51), for rounding said second filter signal to a second rounded signal;
a second combining device (43,53) connected to the second rounder device (42,52) for calculating a second filter error by combining said source signal with said second rounded signal.

27. A data transmission device (20) including input signal receiver means (22), transmitter means (23) for transmitting a coded signal and a filter device (1) as claimed in claim 26 connected to the input signal receiver means and the transmitter means.

28. A data storage device (30) for storing data on a data container device (31), including holder means (32) for a data container device, writer means (33) for writing data to the data container device, input signal receiver means (34) and a filter device (1) as claimed in claim 26 connected to the input signal receiver means (34) and the writer means (33).

29. An audio-visual recorder device (60), including audio-visual input means (61), data output means (62) and a filter device (1) as claimed in claim 26.

* * * * *